US007496838B2

(12) United States Patent
Salter et al.

(10) Patent No.: US 7,496,838 B2
(45) Date of Patent: Feb. 24, 2009

(54) CONVERTING MARKUP LANGUAGE FILES

(75) Inventors: Craig Salter, Hamilton (CA); Christina P. Lau, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1400 days.

(21) Appl. No.: 10/313,284

(22) Filed: Dec. 5, 2002

(65) Prior Publication Data

US 2004/0010753 A1 Jan. 15, 2004

(30) Foreign Application Priority Data

Jul. 11, 2002 (CA) .................................. 2393035

(51) Int. Cl.
G06F 17/00 (2006.01)
(52) U.S. Cl. ...................................... 715/239; 715/243
(58) Field of Classification Search .............. 715/501.1, 715/513, 239, 243
See application file for complete search history.

(56) References Cited

U.S. PATENT DOCUMENTS

| 5,937,160 A * | 8/1999 | Davis et al. ................. 709/203 |
| 6,192,382 B1 * | 2/2001 | Lafer et al. .................. 715/513 |
| 6,263,332 B1 | 7/2001 | Nasr et al. |
| 6,336,124 B1 | 1/2002 | Alam et al. |
| 6,336,137 B1 | 1/2002 | Lee et al. |
| 2001/0056460 A1 * | 12/2001 | Sahota et al. ............... 709/201 |
| 2002/0073119 A1 * | 6/2002 | Richard ....................... 707/513 |
| 2002/0147748 A1 * | 10/2002 | Huang et al. ................ 707/517 |

OTHER PUBLICATIONS

Bompani, Luca, et al, "Software Engineering and the Internet: A Roadmap", Proceedings of the Conference on the Future of Software Engineering, May 2000, pp. 303-315.*
Maglio, Paul, et al, "Intermediaries Personalize Information Streams", Communications of the ACM, vol. 43, Issue 8, Aug. 2000, pp. 96-101.*
Computer Society, Proceedings for the 2002 Symposium on Applications and the Internet (SAINT'02), "XSLT Stylesheet Generation by Example with WYSIWYG Editing" by Kouichi Ono et al, pp. 150-159.

* cited by examiner

*Primary Examiner*—Laurie Ries
(74) *Attorney, Agent, or Firm*—Mark S. Walker; Libby Handelsman; Jeffrey L. Streets

(57) ABSTRACT

The invention provides for the separation of formatting and content data in a first markup file (e.g., an HTML file) so that a second markup language file (e.g., an XML file) containing the content data and formatting or presentation data file (e.g., an XSL file) can be created. Content data in the first file that is to be converted is tagged. The tagged data may be included in an HTML file. The invention processes the tagged data so that content data is identified and used to generate a file in the second format (e.g., an XML file). The presentation or formatting data is also identified and used to generate the presentation data file (e.g., an XSL file). The invention can be employed to convert the existing data files (e.g., HTML files) into files which are separated into content data files (e.g., XML files) and presentation data files (e.g., XSL files).

17 Claims, 15 Drawing Sheets

Figure 6

Ski Report - British Columbia

| | Resort (602a) | Snow Depth (602b) | Primary Surface (602c) | Lifts Open (602d) | Runs Open (602e) |
|---|---|---|---|---|---|
| 604a | Apex Mountain | 79-85" | Packed Powder | 3 of 5 | 60 of 60 |
| 604b | Big White | 116-116" | Packed Powder | 13 of 13 | 112 of 112 |
| 604c | Fernie Alpine | 144-144" | Spring Conditions | 10 of 10 | 106 of 106 |
| 604d | Kimberley | 69"-69" | Spring Conditions | 7 of 8 | 67 of 67 |
| 604e | Panorama Mountain | 52-71" | Spring Conditions | 10 of 10 | 100 of 100 |
| 604f | Silver Star | 91-95" | Packed Powder | 5 of 9 | 107 of 107 |
| 604g | Whistler/Blackcomb | 115-115" | Powder | 33 of 33 | 200 of 200 |

Figure 7A

```
<html>
<head>

<meta http-equiv="content-type" content="text/html; charset=ISO-8859-1"/>
  <title>SkiReport</title>

</head>
<body>
<b>    Ski Report - British Columbia</b><br/>
<br/>
<table cellpadding="2" cellspacing="2" border="0" width="100%">
  <tbody>
    <tr>
      <th valign="Middle" align="Center">Resort</th>
      <th valign="Top" align="Center">Snow Depth</th>
      <th valign="Top" align="Center">Primary Surface</th>
      <th valign="Top" align="Center">Lifts Open</th>
      <th valign="Top" align="Center">Runs Open</th>
    </tr>
    <tr>
      <td valign="Middle" align="Center">Apex Mountain</td>
      <td valign="Top" align="Center">79-85"</td>
      <td valign="Top" align="Center">Packed Powder</td>
      <td valign="Top" align="Center">3 of 5</td>
      <td valign="Top" align="Center">60 of 60</td>
    </tr>
    <tr>
      <td valign="Middle" align="Center">Big White</td>
      <td valign="Top" align="Center">116-116"</td>
      <td valign="Top" align="Center">Packed Powder</td>
      <td valign="Top" align="Center">13 of 13</td>
      <td valign="Top" align="Center">112 of 112</td>
    </tr>
```

```
<tr>
    <td valign="Middle" align="Center">Fernie Alpine</td>
    <td valign="Top" align="Center">144-144"</td>
    <td valign="Top" align="Center">Spring Conditions</td>
    <td valign="Top" align="Center">10 of 10</td>
    <td valign="Top" align="Center">106 of 106</td>
</tr>
<tr>
    <td valign="Middle" align="Center">Kimberley</td>
    <td valign="Top" align="Center">69"-69"</td>
    <td valign="Top" align="Center">Spring Conditions</td>
    <td valign="Top" align="Center">7 of 8</td>
    <td valign="Top" align="Center">67 of 67</td>
</tr>
<tr>
    <td valign="Middle" align="Center">Panorama Mountain</td>
    <td valign="Top" align="Center">52-71"</td>
    <td valign="Top" align="Center">Spring Conditions</td>
    <td valign="Top" align="Center">10 of 10</td>
    <td valign="Top" align="Center">100 of 100</td>
</tr>
<tr>
    <td valign="Middle" align="Center">Silver Star</td>
    <td valign="Top" align="Center">91-95"</td>
    <td valign="Top" align="Center">Packed Powder</td>
    <td valign="Top" align="Center">5 of 9</td>
    <td valign="Top" align="Center">107 of 107</td>
</tr>
<tr>
    <td valign="Middle" align="Center">Whistler/Blackcomb</td>
    <td valign="Top" align="Center">115-115"</td>
    <td valign="Top" align="Center">Powder</td>
    <td valign="Top" align="Center">33 of 33</td>
    <td valign="Top" align="Center">200 of 200</td>
</tr>
</tbody>
</table>
</body>
</html>
```

```
<?HTMLTemplate version="0.1"?>
<TemplateRegion name="Root">
<html>
<head>

<meta http-equiv="content-type" content="text/html; charset=ISO-8859-1"/>
  <title>SkiReport</title>

</head>
<body>
<b>    Ski Report - British Columbia</b><br/>
<br/>
<table cellpadding="2" cellspacing="2" border="0" width="100%">
 <tbody>
   <tr>
     <th valign="Middle" align="Center">Resort</th>
     <th valign="Top" align="Center">Snow Depth</th>
     <th valign="Top" align="Center">Primary Surface</th>
     <th valign="Top" align="Center">Lifts Open</th>
     <th valign="Top" align="Center">Runs Open</th>
   </tr>
   <TemplateRegion name="SkiResort">              ← 802
   <tr>
     <td valign="Middle" align="Center">{Resort}</td>
     <td valign="Top" align="Center">{SnowDepth}</td>
     <td valign="Top" align="Center">{PrimarySurface}</td>
     <td valign="Top" align="Center">{LiftsOpen}</td>
     <td valign="Top" align="Center">{RunsOpen}</td>
   </tr>
   </TemplateRegion>          ← 806
 </tbody>
</table>
</body>
</html>
</TemplateRegion>
```

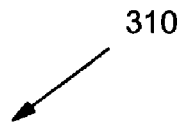
310

```
<?xml version="1.0" encoding="UTF-8"?>
<Root>
 <SkiResort>
   <Resort>Apex Mountain</Resort>
   <SnowDepth>79-85"</SnowDepth>
   <PrimarySurface>Packed Powder</PrimarySurface>
   <LiftsOpen>3 of 5</LiftsOpen>
   <RunsOpen>60 of 60</RunsOpen>
 </SkiResort>
 <SkiResort>
   <Resort>Big White</Resort>
   <SnowDepth>116-116"</SnowDepth>
   <PrimarySurface>Packed Powder</PrimarySurface>
   <LiftsOpen>13 of 13</LiftsOpen>
   <RunsOpen>112 of 112</RunsOpen>
 </SkiResort>
 <SkiResort>
   <Resort>Fernie Alpine</Resort>
   <SnowDepth>144-144"</SnowDepth>
   <PrimarySurface>Spring Conditions</PrimarySurface>
   <LiftsOpen>10 of 10</LiftsOpen>
   <RunsOpen>106 of 106</RunsOpen>
 </SkiResort>
 <SkiResort>
   <Resort>Kimberley</Resort>
   <SnowDepth>69"-69"</SnowDepth>
   <PrimarySurface>Spring Conditions</PrimarySurface>
   <LiftsOpen>7 of 8</LiftsOpen>
   <RunsOpen>67 of 67</RunsOpen>
 </SkiResort>
```

```
<SkiResort>
   <Resort>Panorama Mountain</Resort>
   <SnowDepth>52-71"</SnowDepth>
   <PrimarySurface>Spring Conditions</PrimarySurface>
   <LiftsOpen>10 of 10</LiftsOpen>
   <RunsOpen>100 of 100</RunsOpen>
 </SkiResort>
 <SkiResort>
   <Resort>Silver Star</Resort>
   <SnowDepth>91-95"</SnowDepth>
   <PrimarySurface>Packed Powder</PrimarySurface>
   <LiftsOpen>5 of 9</LiftsOpen>
   <RunsOpen>107 of 107</RunsOpen>
 </SkiResort>
 <SkiResort>
   <Resort>Whistler/Blackcomb</Resort>
   <SnowDepth>115-115"</SnowDepth>
   <PrimarySurface>Powder</PrimarySurface>
   <LiftsOpen>33 of 33</LiftsOpen>
   <RunsOpen>200 of 200</RunsOpen>
 </SkiResort>
</Root>
```

Figure 10

```
<?xml version="1.0"?>
<xsl:transform version="1.0" xmlns:xsl="http://www.w3.org/1999/XSL/Transform">
  <xsl:import href="sr-presentationLogic.xsl"/>

<xsl:template match="/*">
    <xsl:call-template name="printRoot"/>
  </xsl:template>

<xsl:template name="handleSkiResort">
    <xsl:for-each select="SkiResort">
      <xsl:call-template name="printSkiResort">
        <xsl:with-param name="Resort">
          <xsl:value-of select="./Resort"/>
        </xsl:with-param>
        <xsl:with-param name="SnowDepth">
          <xsl:value-of select="./SnowDepth"/>
        </xsl:with-param>
        <xsl:with-param name="PrimarySurface">
          <xsl:value-of select="./PrimarySurface"/>
        </xsl:with-param>
        <xsl:with-param name="LiftsOpen">
          <xsl:value-of select="./LiftsOpen"/>
        </xsl:with-param>
        <xsl:with-param name="RunsOpen">
          <xsl:value-of select="./RunsOpen"/>
        </xsl:with-param>
      </xsl:call-template>
    </xsl:for-each>
  </xsl:template>

<xsl:template name="handleRoot">
    <xsl:for-each select="Root">
      <xsl:call-template name="printRoot"/>
    </xsl:for-each>
  </xsl:template>

</xsl:transform>
```

```
<?xml version="1.0"?>
<?HTMLTemplate version="0.1"?>
<!-- ================================================================== -->
<!-- This file was generated by IBM's HTMLToXSL Generator.              -->
<!-- ================================================================== -->
<xsl:transform version="1.0" xmlns:xsl="http://www.w3.org/1999/XSL/Transform">
<?HTMLTemplate version="0.1"?>

<!-- ================================================================== -->
<!-- printRoot                                                           -->
<!-- ================================================================== -->
<xsl:template name="printRoot">
<html>
<head>
<meta content="text/html; charset=ISO-8859-1" http-equiv="content-type"/>
<title>SkiReport</title>
</head>
<body>
<b>Ski Report - British Columbia</b>
<br/>
<br/>
<table border="0" cellpadding="2" cellspacing="2" width="100%">
<tbody>
<tr>
    <th align="Center" valign="Middle">Resort</th>
    <th align="Center" valign="Top">Snow Depth</th>
    <th align="Center" valign="Top">Primary Surface</th>
    <th align="Center" valign="Top">Lifts Open</th>
    <th align="Center" valign="Top">Runs Open</th>
</tr>
<xsl:call-template name="handleSkiResort"/>
</tbody>
</table>
</body>
</html>
</xsl:template>
```

```
<!--=================================================-->
<!-- printSkiResort                                -->
<!--=================================================-->
<xsl:template name="printSkiResort">
  <xsl:param name="RunsOpen"/>
  <xsl:param name="LiftsOpen"/>
  <xsl:param name="PrimarySurface"/>
  <xsl:param name="SnowDepth"/>
  <xsl:param name="Resort"/>
  <tr>
    <td align="Center" valign="Middle">
      <xsl:value-of select="$Resort"/>
    </td>
    <td align="Center" valign="Top">
      <xsl:value-of select="$SnowDepth"/>
    </td>
    <td align="Center" valign="Top">
      <xsl:value-of select="$PrimarySurface"/>
    </td>
    <td align="Center" valign="Top">
      <xsl:value-of select="$LiftsOpen"/>
    </td>
    <td align="Center" valign="Top">
      <xsl:value-of select="$RunsOpen"/>
    </td>
  </tr>
</xsl:template>

<!--=================================================-->
<!-- Override these methods to specify parameters and control flow logic  -->
<!--=================================================-->

<xsl:template name="handleSkiResort">
  <xsl:call-template name="printSkiResort"/>
</xsl:template>
</xsl:transform>
```

CONVERTING MARKUP LANGUAGE FILES

FIELD OF THE INVENTION

The invention relates generally to the conversion of files from one format to another and, more particularly, relates to converting markup language files from one format to another.

BACKGROUND OF THE INVENTION

The Internet and, more particularly, the world wide web (WWW) portion, has developed tremendously over the past decade. The development of the WWW is now one of the primary means for people and various organizations (e.g., companies, not-for-profit organizations, individuals, etc.) to communicate and contact persons or other organizations. The interaction between a web site provider and a reader may be predominately one-way (e.g., data flowing predominately from the web site provider to the reader) or two-way.

As a result of the explosive development and use of the WWW, the use of markup languages has become quite common. Most common amongst these is the HyperText Markup Language (HTML). Many web sites are simply a collection of hyperlinked (or "linked") HTML files. The individual HTML files typically include both content (e.g., information that is being conveyed to the reader) and formatting information (e.g., display data used to format the visual characteristics of the content on a screen). There has been some use of stylesheets (a stylesheet is a file that is used to store margins, tabs, fonts, headers, footers and other layout settings for a particular category of document. When a style sheet is selected, its format settings are applied to all the documents created under it, saving the page designer or programmer from redefining the same settings over and over again for each page) to generate web sites but the use of these stylesheets is not particularly common and certainly not widespread. Implementations of stylesheets for HTML include the Cascading Style Sheets (CSS) language.

HTML files requested by a user of web browser (e.g., Netscape Navigator, Microsoft Internet Explorer, Opera, Mozilla, etc.) are parsed by the web browser to generate (i.e., render) the visual display of data presented on the display device of the user (e.g., CRT, LCD display, etc.).

Resulting from the ubiquity of web browsers, the use of the WWW and HTML files, many people (often non-computer programmers/developers) have developed an understanding of HTML and, to a lesser extent, CSS.

Recently, the use of the extensible Markup Language (XML) has become more common and is expected to become the lingua franca of the WWW particularly and the Internet generally in the near future. XML is used for defining data elements on a Web page and business-to-business documents. It uses a similar tag structure as HTML; however, whereas HTML defines how elements are displayed, XML defines what those elements contain. HTML uses predefined tags, but XML allows tags to be defined by the developer of the page. Thus, virtually any data items, such as product, sales rep and amount due, can be identified, allowing Web pages to function like database records. By providing a common method for identifying data, XML supports business-to-business transactions and is expected to become the dominant format for electronic data interchange. However, XML can also be used to generate HTML files that can be displayed by web browsers.

Similar to the relationship between CSS and HTML, the eXtensible Stylesheet Language (XSL) relates to XML. XSL is commonly applied to the task of transforming XML data into HTML data that is suitable for presentation in a web browser through use of an eXtensible Stylesheet Language Transformation (XSLT) processor. A web developer that chooses to make use of XSL needs to be able to write XSL code that will process XML data to produce a visually appealing web page. In order to write this code, an XSL programmer will typically work from an HTML template. This HTML template provides an example to the XSL programmer of the kind of result that the transformation should produce. This HTML template may be created from scratch by the developer (or perhaps by a graphic designer or other non-computer programmers) most often using a WYSIWYG HTML editor. Often in cases where developers are migrating from other technologies to XML/XSL these HTML templates will already exist. After acquiring an appropriate HTML template the XSL programmer is faced with the task of writing the code to present the XML input in the form specified by the HTML template.

The most common approach that is currently used to perform this task of creating the XSL data involves copying sections of HTML code into XSL template bodies. This approach suffers from the fact that the presentation logic (HTML tags) and the data logic (XPaths, etc.) are jumbled together. Because the HTML code is now broken into dispersed fragments, a WYSIWYG editor can no longer be used to maintain the HTML code. Similarly the concerns of presentation and data logic can no longer be divided and assigned to different parties.

Additionally, since much of the creation of content and formatting data contained within HTML files is created by non-computer programmers (e.g., graphic designers, content creators, etc.), requiring these creators to learn, understand and develop XSL code is a monumental undertaking. Additionally, the number of developers available that have a competent understanding of XSL, XML and HTML to generate XSL so that XML files can be used to generate HTML files is not sufficient.

At least two approaches to the problems noted above in converting XML data into HTML data files are known to the inventors of the present application. In the first approach as described above, HTML data and XSL data are mixed into a single file. However, this approach has some significant drawbacks. Notably, the mixed HTML/XSL file cannot be maintained or edited using known WYSIWYG HTML editors. In the second approach, using an HTML template, the HTML template is processed to generate XSL code. This second approach while having certain advantages over the first, also has some notable shortcomings.

Accordingly, it would be desirable to provide solution which addresses these shortcomings, at least in part.

SUMMARY OF THE INVENTION

The present invention is directed to providing for the conversion of markup language files or data.

The invention provides for the separation of formatting and content data in a first markup file (e.g., an HTML file) so that a second markup language file (e.g., an XML file) containing the content data and formatting or presentation data file (e.g., an XSL file) can be created.

Content data in the first file that is to be converted is tagged. The tagged data may be included in an HTML file. The invention processes the tagged data so that content data is identified and used to generate a file in the second format (e.g., an XML file). The presentation or formatting data is also identified and used to generate the presentation data file (e.g., an XSL file). The invention can be employed to convert the existing data files (e.g., HTML files) into files which are separated into content data files (e.g., XML files) and presentation data files (e.g., XSL files).

In one aspect of the present invention there is provided encouragement to move from the HTML-centric space where content and presentation data are combined to the XML, XSL-centric space which separates the content from the presentation data. The XML data can then be used purposes other than the simple generation of HTML files using an XSLT processor.

Advantageously, content creators can continue to use their skills and tools which are directed towards HTML. Embodiments of the invention are able to transform the HTML files into XML and XSL files thus providing a separation between style (i.e., presentation or formatting) and data (e.g., content).

Advantageously, the inventors have recognized that the second approach described above requires significant development complexity in that the XSL processor must handle two inputs—the original XML file and the processed HTML file. This results in more complicated XSL code. Additionally, the second approach requires additional CPU time at runtime which can be a significant detriment. Specifically, at runtime, the XSL processor must manipulate both the XML and HTML files. In a further shortcoming recognized by the present inventors, the second approach includes much of the code in the HTML template file. Unfortunately, many common XSL processors/compilers have been developed to precompile XSL code into Java to improve service side performance. By including much of the code in the HTML file which the XSL processor must handle in conjunction with an input XML file, the benefit of this pre-compilation into Java is lost. The present invention, in some embodiments, only a single input (e.g., an XML file) is required. Moreover, the invention provides improved runtime performance since much of the computation (e.g., CPU time) that is required can be performed at development time (e.g., by a developer) rather than at runtime which would result in users desiring to view the HTML generated from an XML input receiving a quicker response to their request.

Other advantages and aspects will be apparent to those of ordinary skill in the art.

In accordance with an aspect of the present invention there is provided a method for converting a first markup file to a second markup file, said method comprising generating said second markup file from data elements extracted from said first markup file using tags in said first markup file; and generating a conversion file using tags in said first markup file, said conversion file, when processed with said second markup file, adapted to generate a third markup file similar to said first markup file.

In accordance with another aspect of the present invention there is provided a computer readable media product storing data and instructions, said data and instructions, when processed by a computer system adapt said computer system to convert a first markup file to a second markup file, said conversion comprising generating said second markup file from data elements extracted from said first markup file using tags in said first markup file; and generating a conversion file using tags in said first markup file, said conversion file, when processed with said second markup file, adapted to generate a third markup file similar to said first markup file.

In accordance with still another aspect of the present invention there is provided a method for converting a first markup file to a second markup file, said method comprising means for generating said second markup file from data elements extracted from said first markup file using tags in said first markup file; and means for generating a conversion file using tags in said first markup file, said conversion file, when processed with said second markup file, adapted to generate a third markup file similar to said first markup file.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention:

FIG. 6 is an exemplary illustration of a rendered HTML file;

FIG. 7, which comprises FIGS. 7A and 7B due to space limitations, is the HTML source code illustrated in rendered form in FIG. 6;

FIG. 8 illustrates the modifications performed on the HTML source file of FIG. 7 resulting from some operations illustrated in FIG. 4;

FIG. 9, which comprises FIGS. 9A and 9B due to space limitations, illustrates an XML file, forming part of FIG. 3, generated during the operations of FIG. 4 on the HTML source file of FIG. 7;

FIG. 10 illustrates a first XSL file, forming part of FIG. 3, generated during the operations of FIG. 4 on the HTML source file of FIG. 7;

FIG. 11, which comprises FIGS. 11A and 11B due to space limitations, illustrates a second XSL file, forming part of FIG. 3, generated during the operations of FIG. 4 on the HTML source file of FIG. 7.

DETAILED DESCRIPTION

It is to be understood that the particular orders of steps or operations described or shown herein are not to be understood as limiting the scope of the general aspects of the invention provided that the result for the intended purpose is similar. As will be understood by those skilled in the art, it is often possible to perform steps or operations in a different order yet obtain the same result. This is often particularly true when implementing a method of steps or operations using computer technology.

To better understand the various portions described below, a general overview is provided so as to provide an overall context for ease of understanding. It is to be understood that this overview is exemplary of an embodiment of the invention is not to be limiting on the scope of the invention.

In overview, an HTML file is input to the HTML-XML-XSL processor (hereinafter the "code generator") which generates the XML and XSL code which separates the content and presentation data (or logic) contained within the HTML file. In many instances, the input HTML file will be a "skeleton" or template HTML file with little or no content data.

Initially, portions or regions of the input HTML file are marked to identify those sections that are to be processed by the code generator. In the exemplary embodiment, two different tags are used: a Regional tag; and a Value tag. The Regional tag identifies a section of the input HTML file that are used for a particular task (e.g., generating and populating a table). For each regional tag added to the input HTML file, an XSL template will be created. In addition to the regional tags, value tags are embedded in the input HTML file and identify the position of where a data value should be substituted during runtime processing of the generated XML and XSL files by the XSLT processor (the XML and XSL files created by the code generator). In the XSL file created by the code generator, each value tag will be used to define a template. The templates created by the code generator (one for each of the region tags and value tags) form part of the XSL file that is created by the code generator.

The tags embedded in the input file can be created either by user input received by code generator or created by the code generator itself. In the latter embodiment, it may be preferable for the automatically created to tags (i.e., those tags embedded in the input HTML file by the code generator) to be verified as satisfactory by receipt of user confirmation data— e.g., receiving user input indicating acceptance of the embedded tags.

Given the general overview provided above, the description of the various components of the embodiments of the invention described herein can now be better understood by those of ordinary skill in the art.

Figure 1:
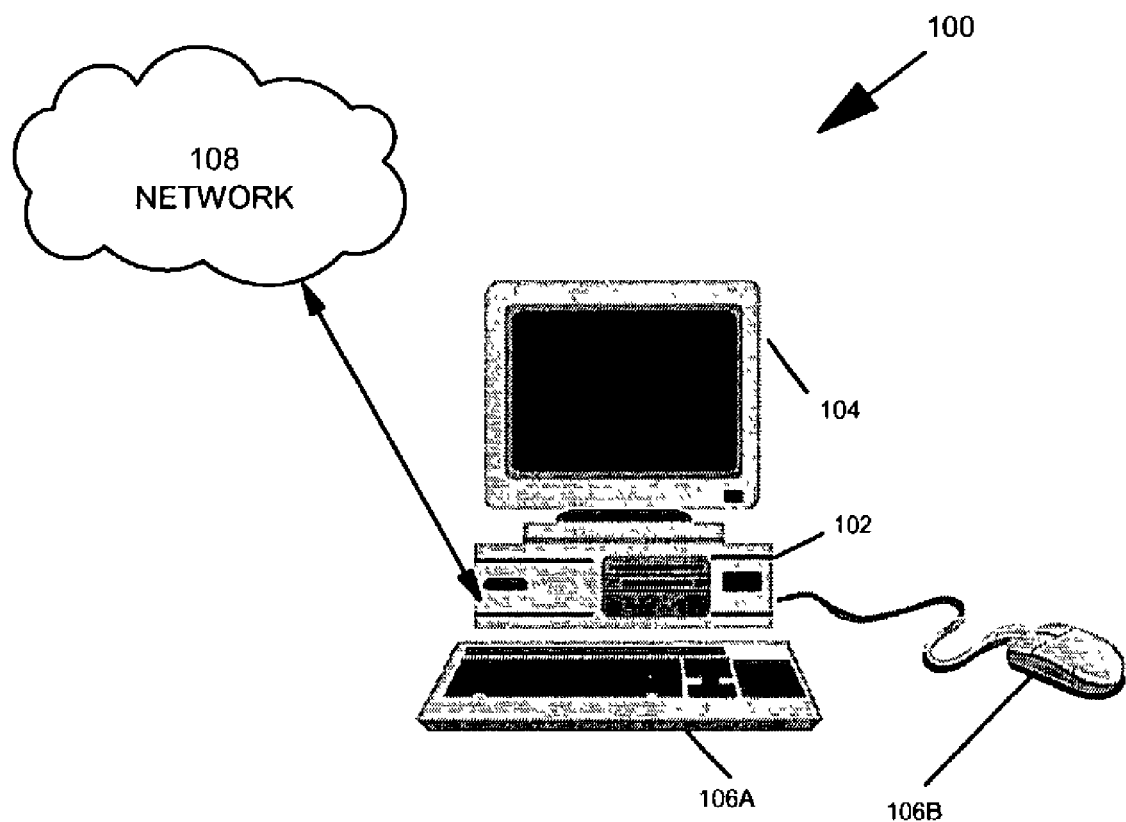
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 108. As will be appreciated by those of ordinary skill in the art, network 108 may be embodied using conventional networking technologies and may include one or more of the following: local area networks, wide area networks, intranets, public Internet and the like. Computer system 100 may interact with other networked computer systems (not shown) thus providing the functions described herein in a distributed environment. That is, although throughout the description herein an embodiment of the invention is illustrated with aspects of the invention embodied solely on computer system 100, as will be appreciated by those of ordinary skill in the art, aspects of the invention may be distributed amongst one or more networked computing devices which interact with computer system 100 via one or more data networks such as, for example, network 108. However, for ease of understanding, aspects of the invention have been embodied in a single computing device—computer system 100.

Computer system 100 includes processing system 102 which communicates with various input devices 104, output devices 106 and network 108. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
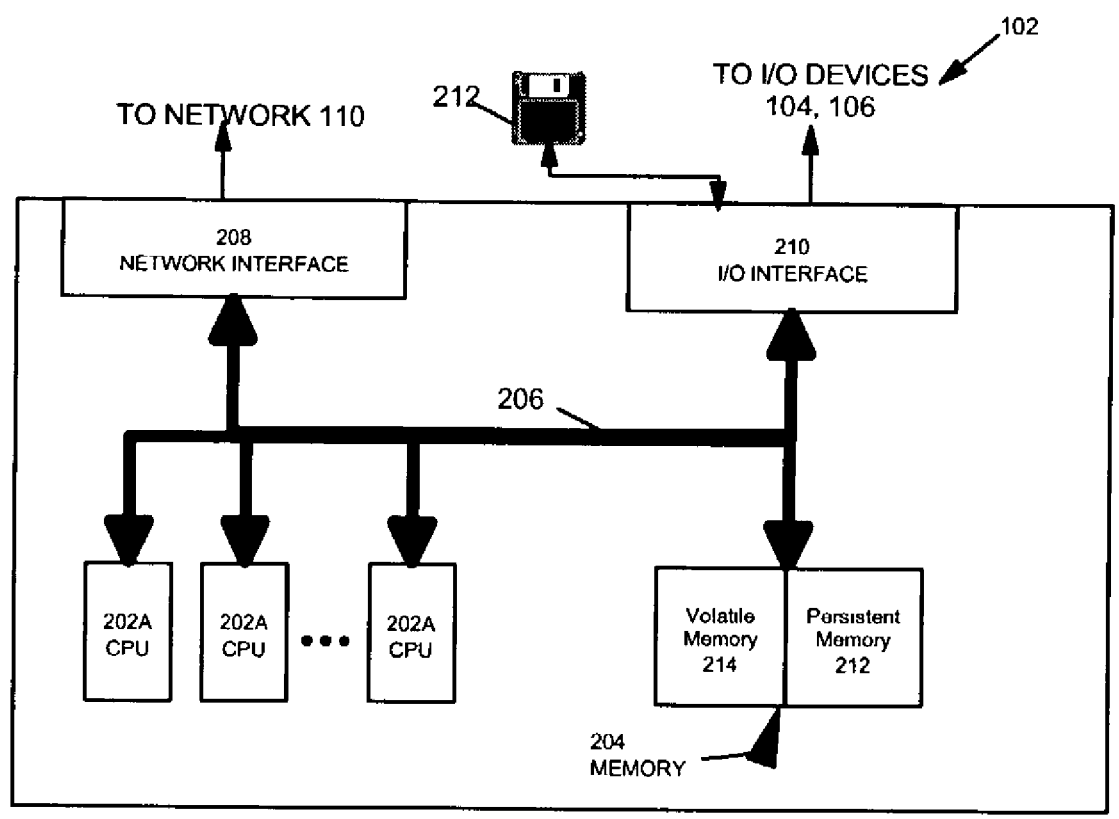
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 108. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 108.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
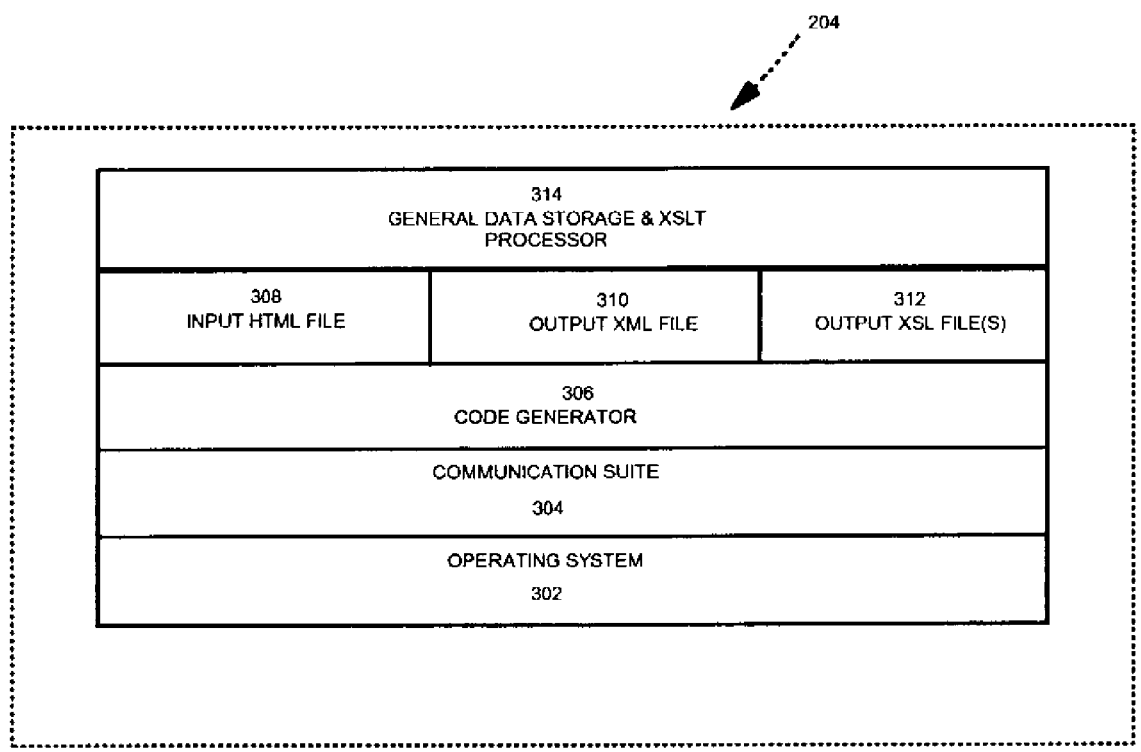
FIG. 3 illustrates, in functional block form, a portion of FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 202 stores operating system (OS) 302, communications suite 304, code generator 306, input HTML file 308, output XML file 310, output XSL file(s) 312 and general data storage (which includes an XLST processor) 314.

OS 302 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 304 provides, through, interaction with OS 302 and network I/F 208 (FIG. 2), suitable communication protocols to enable communication with other networked computing devices via network 108 (FIG. 1). Communication suite 304 may include one or more of such protocols such as TCP/IP, ethernet, token ring and the like.

Code generator 306 is adapted to receive an input HTML file 308 and output an XML file 310 and one or more XSL files 312. In the exemplary embodiment code generator 306 is also adapted to receive user input (such as from mouse 106B, FIG. 1). The user input received by code generator 306 identifies those portions of input HTML file 308 that should be tagged as "regions" or "values". In alternative embodiments, code generator 306 may be adapted to identify portions of input HTML file 308 as "regions" or "values" automatically. In this alternative embodiment, such identified portions could require user input to verify that the automatically identified portions are suitable or desirable. The operations of code generator 306 are better understood with reference the operations illustrated in flow chart form in FIGS. 4 and 5.

Input HTML file 308 is a conventional HTML file that includes both content and presentation data.

Output XML file 310 is generated by code generator 306 based on input HTML file 308. XML file 310 contains the content data of HTML file 308.

In the exemplary embodiment, XSL files 312 includes two separate XSL files: a data logic XSL file and a presentation logic XSL file. However, it should be noted that these two separate XSL files could be combined into a single file in alternative embodiments. Separating XSL file 312 into two files enables a first file (the data logic file—hereinafter XSL data logic 312*a*) to include the navigation logic to navigate the generated XML file 310 and calls the templates defined in the second file (the presentation logic file—hereinafter XSL presentation logic 312*b*). Advantageously, the creation of XSL files 312*a*, 312*b* distills from a the stylesheet the logical aspects (stored in XSL data logic 312*a*) from the presentation aspects (stored in XSL presentation logic 312*b*).

Figure 4:
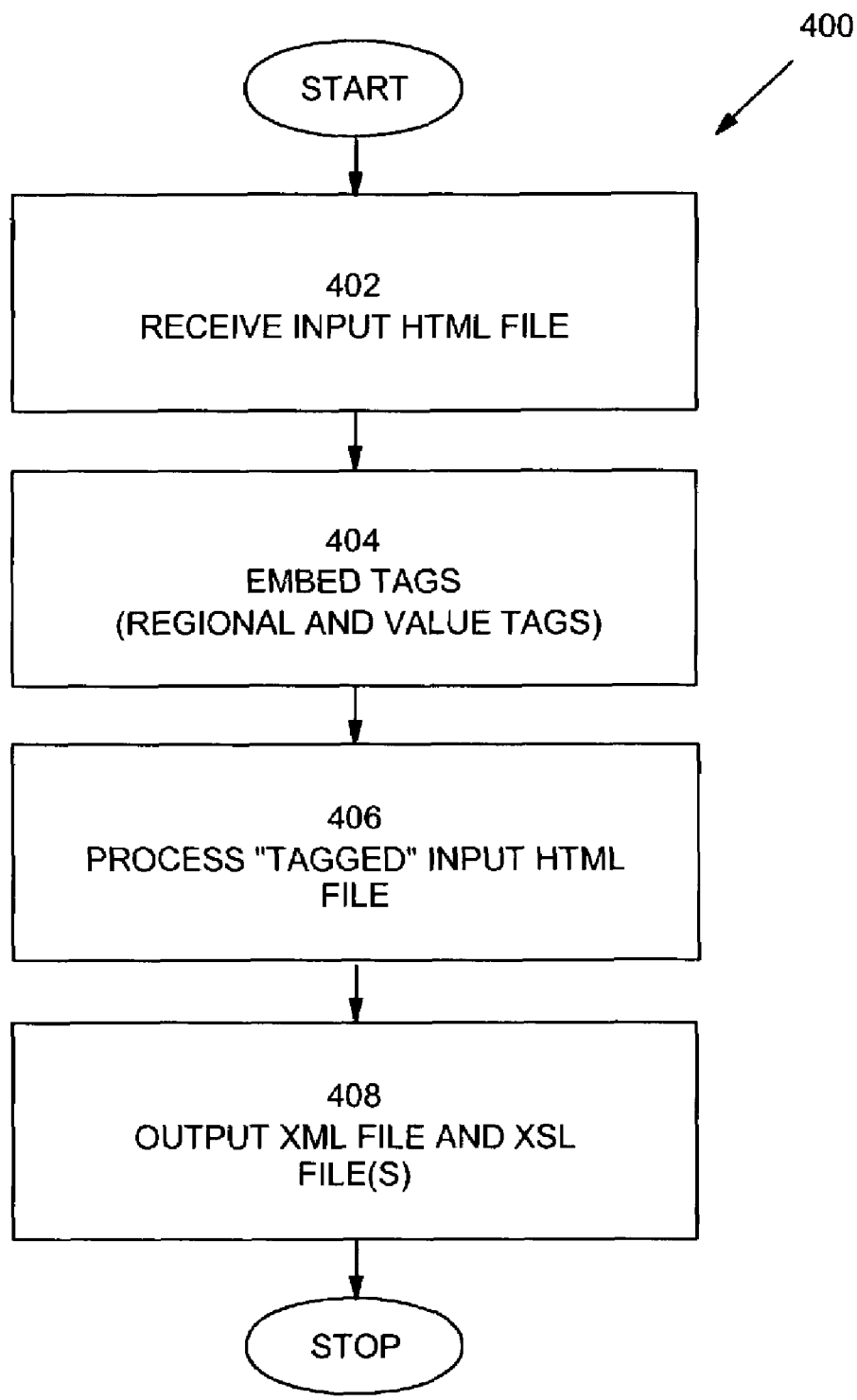
FIG. 4 is a flowchart of exemplary operations of the computer system of FIG. 1.
Figure 5:
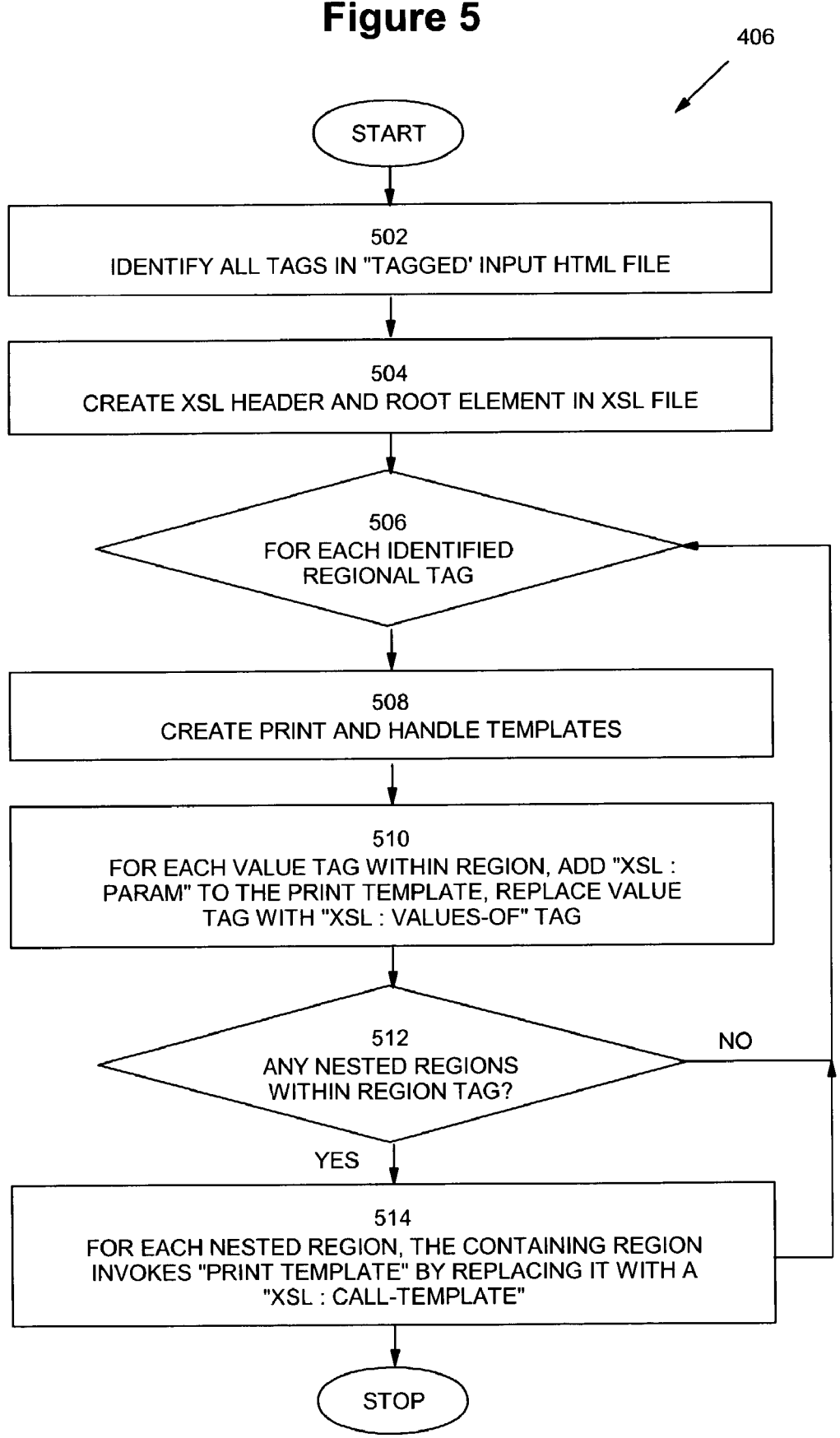
FIG. 5 is a flowchart illustrating more detailed operations performed during the operations illustrated in FIG. 4.

Operations 400, which are performed by code generator 306, are illustrated in flow chart form in FIGS. 4 and 5. However, an understanding and detailed description of code generator 306 will be better understood with reference to an exemplary input HTML file 308 and the resulting output files—XML file 310, XSL data logic file 312*a* and XSL presentation logic file 312*b*. Accordingly, an exemplary HTML input file 308 (hereinafter "SkiResort.html 308") is illustrated in source code form in FIG. 7. When SkiResort.html 308 is rendered by an HTML browser (such as those identified above), the rendered image generated is illustrated in FIG. 6. The exemplary XML output file 310 (hereinafter "SR-Data.xml 310") generated by code generator 306 as a result of processing SkiResort.html 308 is illustrated in FIG. 9. An exemplary intermediate file (hereinafter "SR-Template.xhtml 800") generated during the processing of SkiResort.html 308 is illustrated in FIG. 8. The exemplary data and presentation logic XSL files 312 (hereinafter "SR-DataLogic.xsl 312*a*" and "SR-PresentationLogic.xsl 312*b*", respectively) also generated by code generator 306 are illustrated in FIGS. 10 and 11, respectively.

As illustrated in FIG. 6, the rendered SkiResort.html 308 is a table which includes a number of rows of data providing ski data about the various ski resorts in British Columbia. SkiResort.html 308 would typically be generated on request to provide potential resort customers (e.g., skiers, vacationers, etc.) with up to the moment data about the ski conditions. However, in HTML format, SkiResort.html 308 is not in a format that would easily enable or support web services to be developed which exploits the data contained in rendered report and included in the source file illustrated in FIG. 7. Accordingly, it would advantageous to transform the data in SkiResort.html 308 into an XML file that would support such a desirable use.

Accordingly, SkiResort.html 308 is input into code generator 306 (operation 402—FIG. 4). Code generator 306 also receives user input during operation identifying those portions that are to be transformed into XML and XSL files (i.e., those regions from which presentation and data logic are to be extracted). In SkiResort.html 308, the user input indicates a selection of region 702 (FIG. 7) which spans FIGS. 7A and 7B. The user input may be provided by the selection of an extraction region using a graphical user interface (GUI) which presents the source code illustrated in FIG. 7 to the user. The user may then highlight, in manners known to those of ordinary skill, those portions of interest.

As a result of receipt of user input, code generator 306 will insert additional "tags" which identify the start and termination points of individual regions mentioned above as "Regional tags". Accordingly, a regional tag is inserted at the start of a each identified region ("<Template Region name="TagName">"—where TagName is an identifier for a selected region) and at the termination of each identified region ("</TemplateRegion>"). The TagName, which uniquely identifies a selected region, may be created by code generator 306 and, if desired, modified by a user. Accordingly, a start and termination regional tag would be inserted in the exemplary embodiment at the start and termination points of region 702. It is to be noted that although only one such region is selected from the SkiResort.html 308 source code (FIG. 7), more than one region could be selected (and would be expected to be selected in other situations). Additionally, regions can be nested. That is, a portion of selected region 702 could be selected to form a second region within the first selected region, if desired. In such a situation a second region would be contained within a first region. As will be appreciated by those of ordinary skill in the art, the second region should be contained wholly or completely within the first region otherwise malformed XML code will be generated. If a user selects a second region which is not wholly contained within a first region (i.e., there is only a partial overlap), the user may be provided with an error or warning message or, alternatively, the second region could be automatically separated into two regions (e.g., regions three and four) by code generator 306. In the latter instance, region three would be completely or wholly contained within the first region and the fourth region would be wholly or completely without (i.e., outside) the first region.

As noted above, in alternative embodiments, a GUI may be provided to a user so as to assist the user in the selection and embedding of tags into the input HTML file 308.

Once the regions have been "tagged" by code generator 306 (404), code generator 306 parses the input HTML file 308 to remove portions of HTML source code which are repeated. Referencing FIG. 7, it is to be noted that much of selected region 702 repeats with only the data changing. For example, data portions 704*a*-704*g* identified in FIG. 7 (and correspond to rendered rows 604*a*-604*g*) repeat with only the data values associated with the various columns 602*a*-602*e* (e.g., resort name, snow depth, primary surface, lifts open and runs open) changing between the various data regions 704. Consequently, code generator 306 will parse SkiResort.html 308 and delete additional copies of the data portions 704. That is, code generator 306 will keep the first repeating data portion 704 (i.e., data portion 704*a*) and delete those data portions 704 that are repetitive (i.e., data portions 704*b*-704*g*).

Following the removal of repetitive data in the selected region 702 of SkiResort.html 308, code generator 306 replaces the data values (i.e., those values which fall under columns 602 in FIG. 6) with "value tags". Each value tag in the exemplary embodiment follows the form "{ValueTag- Name}" where the ValueTagName uniquely identifies data that would otherwise be present in the selected region 702. The unique identifiers for ValueTagName are, in the exemplary embodiment, suggested by code generator 306 and may be modified by user input to provide a more descriptive and easily understood identifier.

The intermediate data file generated as a result of the performance of operations 402 and 404 is illustrated as SR-Template.xhtml 800 in FIG. 8. As should be apparent to those of ordinary skill in the art, selected region 702 (FIG. 7) has been transformed into regional template region 808 in SR-Template.xhtml 800. Regional template region 808 includes a start regional tag 802 ("<TemplateRegion name="SkiResort">") and a termination regional tag 806 ("</TemplateRegion>"). The repetitive data portions 704*b*-704*g* have been removed and the remaining data portion 704*a* has been modified to become modified data portion 804. As will be noted, the data values in data portion 704*a* (i.e., Apex Mountain, 79-85", Pack Powder, 3 of 5, and 60 of 60) have been replaced with value tags in portions 810*a*-810*e* where the ValueTagNames are {Resort}, {SnowDepth}, {PrimarySurface}, {LiftsOpen}, and {RunsOpen}, respectively.

The intermediate file—SR-Template.xhmtl 800—may only exist as a temporary file in either or both volatile and persistent memory 204.

Once SR-Template.xhtml 800 has been created (as a result of operations 402, 404—FIG. 4), the input file, SkiResort.html 308 is processed (operation 406) by code generator 306 to create output files 310 and 312 (operation 408)—SR-Data.xml 310 (FIG. 9), SR-DataLogic.xsl 312*a* (FIG. 10) and SR-PresentationLogic.xsl 312*b* (FIG. 11), respectively.

The generation of the output files 310 and 312 is better understood with reference to FIG. 5. Code generator 306 during operation 406 performs operations 502-514 to process the intermediate file 312 and the input HTML file 308 to generate output files 310, 312.

Code generator 306 parses the intermediate SR-Template.xhtml file 800 to identify all of the tags (regional and value tags) in the SR-Template file 800 (502). In the exemplary embodiment, one regional tag pair (start and termination tags 802, 806, respectively) and the value tags 810*a*-810*e* ({Resort}, {SnowDepth}, {PrimarySurface}, {LiftsOpen}, and {RunsOpen}, respectively) will be identified.

Using the information from the parsing (502), code generator 306 is effectively using SR-Template.xhmtl 800 as an HTML template file. Code generator 306 extracts the content data from input HTML file 308 and generates a conventional XML file as output—i.e., XML file 310.

The extraction of content data from input HTML file 308 so as to generate XML file 310 is performed in the exemplary embodiment by code generator 306. However, a separate extractor component could be used to implement this functionality in alternative embodiments.

Figure 12:
FIG. 12 illustrates an XML file used during the operations of FIG. 4.

In the described implementation, code generator 306 creates an intermediate XSL file (illustrated as intermediate XSL file 1200 in FIG. 12). In the exemplary embodiment, intermediate XSL file 1200 is used for internal processing only and is not exposed to a user. However, intermediate file 1200 could, in alternative embodiments, be presented (i.e., exposed) to the user so that the user input could be received to modify the behaviour of file 1200. That is, modifications to file 1200 responsive to user input could be accepted by code generator 306 so as to enable different or more precise data extraction.

Intermediate XSL file 1200 is used by code generator 306 to extract the data from the HTML input file. After analyzing the HTML template, code generator 306 determines XPaths that specify the positions where data and repeating blocks of HTML may occur. Region tags in the HTML template file (e.g., SR-Template.xhtml 800 illustrated in FIG. 8) are used to identify the positions where blocks of HTML occur that require extraction. Value tags in the HTML template are used to identify where a piece of data (typically a text node or attribute node) is located within the block of HTML.

This generated XSL file 1200 provides the logic to perform the task extracting the embedded data from the original HTML file. The format of the XML file generated from extracting the data depends on the structure and naming of the Region and Value tags that have been used to specify the HTML template.

To generate the intermediate XSL file 1200 (FIG. 12) xsl:transform and xsl:output structures are initially created. Additionally, a "seed" xsl:template structure is also create which is matched to the root of the input HTML file and is used to invoke the "Root" xsl:template also forming part of the created XSL file 1200. Once these initial structures have been created, an xsl:template structure is created for each region tag (including the "Root" region tag) in the HTML template file (e.g., SR-Template.xhtml 800 illustrated in FIG. 8). Each xsl:template structure so created is named to correspond to the name of the associated region tag. If a region tag is nested within another region tag, then the XPath is determined to specify the position of the nested region tag's content relative to its parent region tag. Code generator 306 will generate the following structure for each nested region tag using the determined (i.e., computed) XPath:

```
<xsl:for-each select="computed-XPath-for-nested-region-tag">
    <xsl:call-template name="nested-region-name"/>
</xsl:for-each>
```

For each nested value tag (i.e., a value tag within a region tag), the XPath is determined by code generator 306 and used to specify the value tag's content relative to its parent region tag. The determined XPath will then be used by code generator 306 to generate the following structure within intermediate XSL file 1200:

```
<Value-Tag-Name>
    <xsl:copy-of select="computed-XPath-for-value-tag">
</Value-Tag-Name>
```

As a result of the generation of the intermediate XSL file, output file 310 (see FIG. 9) can be generated by code generator 306 processing intermediate XSL file 1200 and input HTML 308.

In addition to generating an XML file from the input HTML file 308, code generator 306 is adapted to create two XSL files—SR-DataLogic.xsl 312*a* (FIG. 10) and SR-PresentationLogic.xsl 312*b* (FIG. 11), respectively (504—FIG. 5). The XSL files will include templates that will encapsulate the presentation details of the input HTML file 308. During operation 504, code generator simply creates the data and presentation logic XSL files which contain initially only minimal XSL information—the header and root elements 1002, 1102, respectively. Additionally, those non-selected regions (i.e., those portions outside of selected region 702—

FIG. 7) in the input HTML file 308 are effectively copied from the input HTML file 308 to the output XSL file 312 (if there is only one file created) or the presentation logic file (i.e., SR-PresentationLogic.xsl file 312b) if two XSL files are created.

Code generator 306 performs operations 506-514 to populate the XSL files 312. For each regional tag pair 802, 860 (FIG. 8) identified by code generator 306 (506), code generator 306 creates print template 1004 and handle templates 1006, 1106 (FIGS. 10 and 11, respectively) (508). Print templates (e.g., print template 1004) are responsible for producing the HTML nodes that are enclosed within a regional tag pair of the intermediate file 800. As those of ordinary skill are aware, XML documents are modeled as a tree of nodes. The XML document is the parent node and each element is also node. Although, HTML typically is referred to as included "tags", the production of the phrase "HTML nodes" is used in view of the terminology "nodes" common in describing XML and XSL.

The print templates are employed by code generator 306 to construct the XML tree in XML output file 310 and each print template consists of an start tag ("<xsl:call-template name="PrintName">") and a termination tag ("</xsl:call-template>"). Handle templates (e.g., handle template 1006) are employed simply to call the associated print template (i.e., those templates using the same identifier—e.g., "SkiResort"). Each handle template consists of an start tag ("<xsl:template name="HandleName">") and a termination tag ("</xsl:template>"). In the exemplary files used for example purposes only, the regional tag pair 802, 806 (FIG. 8) identified as "SkiResort" results in the creation during operation 508 by code generator 306 of handle template 1006 (FIG. 10) identified as "handleSkiResort" (i.e., "handle" concatenated with the identifier of the selected regional tag pair) and the print template 1004 identified as "printSkiResort" (i.e., "print" concatenated with the identifier of the selected regional tag pair) in the SR-DataLogic.xsl file 312a. Code generator 306 also creates the handle template 1104 in the SR-PresentationLogic.xsl file 312b.

During the processing of a selected regional tag pair (e.g., regional tag pair 802, 806) code generator 306 processes any value tags identified in the region bounded by the selected regional tag pair (510). For each value tag identified in the selected region (there are five such value tags—810a-810e—in the exemplary intermediate file 800), an "xsl:param" code is added to the print template in the data logic file 312a. The format of the "xsl:param" code added to the print template comprises a start tag ("<xsl:with-param name="ValueTagIdentifer">") and a termination tag ("</xsl:with-param>"). Within the "xsl:param" code of the print handle a "xsl:value-of" code is added (following the form "<xsl:value-of select="./ValueTagIdentifter"/>"). The "xsl:value-of" code will be used to output the value of the associated parameter.

In the example, five value tags are identified in the selected region. Accordingly, five value tag templates (comprising the "xsl:param" and "xsl:value-of" codes) are added to SR-DataLogic.xsl file 312a—namely value tag templates 1008a-1008e.

After processing each value tag within the selected region (510), code generator determines if there are any nested regions (i.e., regions contained within) the region being processed (514). In the example files, no such nested regions exist and since there is only one region (region 702), code generator 306 ceases operation having created XSL files 312. However, assuming that a nested region did exist, code generator would perform operations 508-514 for that nested region. Additionally, code generator 306 would add code to invoke the print template for the nested region inside the print template of the containing region. That is, assume region 702 included a nested region. In this assumed example, code generator would add XSL code inside the print template for region 702 (i.e., print template 1004) to invoke the print template of the nested region.

As a result of the foregoing, the presentation logic, data logic and content data that was originally mixed into a single file (input HTML file 308) has been separated into three files—an XML file 310 that contains only content data; a first XSL file—SR-DataLogic.xsl file 312a—that includes the navigation logic to navigate the generated XML file 310 and calls the templates defined in the second XSL file; and a second XSL file—SR-PresentationLogic.xsl file 312b—that includes the formatting or presentation logic contained in the input HTML file 308.

As will be appreciated by those ordinary skill in the art, when a user requests to view a web page (i.e., a rendering of the data originally present in the input HTML file 308), the web page server will need to process XML file 310 and XSL files 312. Responsive to such a runtime request, a web server will use an XSL processor to generate an HTML file from XML and XSL files 310, 312, respectively. Unlike alternative approaches known by the inventors of the present invention, the XSL processor need handle only one data file related to content data (i.e., only XML file 310) in contrast to other approaches which require two files—an HTML template and an XML input file. As will be understood, the data logic file 312a, when processed by the XSL processor, imports the presentation logic file 312b, thus enabling a runtime HTML file to be generated responsive to a user request without significant CPU processing required. That is, the HTML file generated at runtime is similar to the original input HTML file. The output displayed by rendering (i.e., processing) the HTML file generated at runtime will appear identical in most instances to the output generated by rendering the original input HTML file.

Those of ordinary skill in the art will understand that the two output XSL files 312a, 312b could be combined into a single XSL file. However, there are advantages which may be obtained in some environments by separating the logic related to the data from the logic related to the presentation of the data.

In the embodiment described herein, the print template is not invoked directly but indirectly by calling the handle template which corresponds to the print template. This indirect invocation enables the insertion of "hooks" to be added. These hooks are code inserted by other processes (e.g., another application) or by user input. Since in one embodiment the data logic XSL file imports the presentation logic XSL file, any templates which are similarly named in both files are redefined in the XSL data logic file (i.e., if any templates exist in both the data logic and presentation logic XSL files, the template in the data logic XSL file takes precedence and overrides the similarly named templates included in the presentation logic XSL file). Accordingly, custom logic code can easily be inserted in the data logic XSL file without any modification required of the presentation logic file. As persons of ordinary skill in the art will appreciate, alternative embodiments of the invention may not implement the indirect invocation of the print template.

In further alternatives and as will be appreciated, the order of some operations 400 and 406 (FIGS. 4 and 5) could be rearranged and redefined. For example, operation 502 could be removed and replaced or redefined such that code creator 306, after creating the base XSL files (operation 504) could parse the intermediate file 800 to identify and then process regional tag pairs individually. That is, code generator 306 could identify a first regional tag pair, perform operations 508-514 and then parse intermediate file 800 to identify and process the next regional tag pair as required.

Those skilled in the art will understand that modifications to the above-described embodiment can be made without departing from the essence of the invention. For example, in one alternative, an embodiment of the present invention may utilize the tagged HTML file at runtime. In such an embodiment, the presentation.xsl file (i.e., an embodiment of XSL presentation logic file 312*b*—FIG. 3) would not be generated (since the presentation information would be accessed at runtime directly from the tagged HTML file). The dataLogic.xsl file (i.e., an embodiment of XSL data logic file 312*a*—FIG. 3) would be generated appropriately to operate on two document trees (the input XML document and the tagged HTML document). As noted above, this approach may have an impact on runtime performance of the transformation).

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A method for convening a first markup file to a second markup file, said method comprising:
    inserting tags into said first markup file, wherein said tags comprise a first tag identifying data elements to be extracted from said first markup file and a second tag identifying a portion of said first markup file which requires conversion;
    generating said second markup file from the data elements extracted from said first markup file using the first tag in said first markup file;
    generating a conversion file using the second tag in said first markup file, said conversion file, when processed with said second markup file, adapted to generate a third markup file similar to said first markup file; and
    displaying output rendered by the third markup file on a graphical user interface.

2. The method of claim 1 wherein said first tag comprises a value tag and said second tag comprises a regional tag.

3. The method of claim 1 wherein said first markup file comprises an HTML file, said second markup file comprises an XML file and said conversion file comprises an XSL file.

4. The method of claim 1 wherein said generating said second markup file comprises:
    extracting said data elements identified by said first tag.

5. The method of claim 4 wherein said generating said conversion file comprises:
    generating a template of said portion identified by said second tag, said template for producing nodes identified by said second tag.

6. The method of claim 5 wherein said generating said conversion file further comprises:
    for each of said first tags in said portion identified by said second tag, copying the portion identified by said first tag and replacing said data element with an identifier for said data element, said identifier replaced during processing to generate said third markup file by a corresponding data element from said second markup file.

7. The method of claim 1 wherein said conversion file comprises a first conversion file and a second conversion file, said first conversion file comprising data logic and said second conversion file comprising presentation logic.

8. A computer readable media product storing data and instructions, said data and instructions, when processed by a computer system adapt said computer system to convert a first markup file to a second markup file, said conversion comprising:
    inserting tags into said first markup file, wherein said tags comprise a first tag identifying data elements to be extracted from said first markup file and a second tag identifying a portion of said first markup file which requires conversion;
    generating said second markup file from the data elements extracted from said first markup file using the first tag in said first markup file; and
    generating a conversion file using the second tag in said first markup file, said conversion file, when processed with said second markup file, adapted to generate a third markup file similar to said first markup file.

9. The computer readable media product of claim 8 wherein said first tag comprises a value tag and said second tag comprises a regional tag.

10. The computer readable media product of claim 8 wherein said first markup file comprises an HTML file, said second markup file comprises an XML file and said conversion file comprises an XSL file.

11. The computer readable media product of claim 8 wherein said generating said second markup file comprises:
    extracting said data elements identified by said first tag.

12. The computer readable media product of claim 11 wherein said generating said conversion file comprises:
    generating a template of said portion identified by said second tag, said template for producing nodes identified by said second tag.

13. The computer readable media product of claim 12 wherein said generating said conversion file further comprises:
    for each of said first tags in said portion identified by said second tag, copying the portion identified by said first tag and replacing said data element with an identifier for said data element, said identifier replaced during processing to generate said third markup file by a corresponding data element from said second markup file.

14. The computer readable media product of claim 8 wherein said conversion file comprises a first conversion file and a second conversion file, said first conversion file comprising data logic and said second conversion file comprising presentation logic.

15. An information handling system for converting a first markup file to a second markup file, said system comprising:
    means for inserting tags into said first markup file, wherein said lags comprise, a first tag identifying data elements to be extracted from said first markup file and a second tag identifying a portion of said first markup file which requires conversion;
    means for generating said second markup file from the data elements extracted from said first markup file using the first tog in said first markup file; and
    means for generating a conversion file using the second tag in said first markup file, said conversion file, when processed with said second markup file, adapted to generate a third markup file similar to said first markup file.

16. The system of claim 15 wherein said first tag comprises a value tag and said second tag comprises a regional tag and wherein said first markup file comprises an HTML file, said second markup file comprises an XML file and said conversion file comprises an XSL file.

17. The system of claim 15 wherein said means for generating said second markup file comprises means for extracting said data elements identified by said first tag, and wherein said means for generating said conversion file comprises means for generating a template of said portion identified by said second tag, said template for producing nodes identified by said second tag and for each of said first tags in said portion identified by said second tag, means for copying the portion identified by said first tag and means for replacing said data element with an identifier for said data element, said identifier replaced during processing to generate said third markup file by a corresponding data element from said second markup file.

* * * * *